United States Patent
De Witt, III et al.

[15] 3,686,361
[45] Aug. 22, 1972

[54] TEREPHTHALIC ACID/1,2-PROPYLENE GLYCOL POLYESTER MODIFIERS FOR POLYVINYL CHLORIDE COMPOSITIONS

[72] Inventors: Walter Groesbeck De Witt, III, 1182 Strathmann Dr., Southampton, Pa. 18966; Marvin Joseph Hurwitz, 8267 Thomson Rd., Elkins Park, Pa. 19117

[22] Filed: April 15, 1969

[21] Appl. No.: 816,419

[52] U.S. Cl. ............... 260/873, 260/31.6, 260/75, 260/475 P
[51] Int. Cl. ...... C08f 29/24, C08g 17/06, C08g 39/10
[58] Field of Search ......... 260/873, 31.6, 75 R, 475 P

[56] References Cited

UNITED STATES PATENTS

| | | | |
|---|---|---|---|
| 2,386,405 | 10/1945 | Meincke | 260/31.6 |
| 3,148,200 | 9/1964 | Mills et al. | 260/31.6 |
| 3,392,135 | 7/1968 | Holub et al. | 260/31.6 |
| 3,041,309 | 6/1962 | Baer | 260/45.5 |
| 3,288,886 | 11/1966 | Hemei et al. | 260/876 |
| 3,331,802 | 7/1967 | Huber et al. | 260/475 P |
| 3,427,287 | 2/1969 | Pengilly | 260/475 P |
| 3,448,173 | 6/1969 | Ryan et al. | 260/876 |
| 3,520,844 | 7/1970 | Pontius et al. | 260/873 |

FOREIGN PATENTS OR APPLICATIONS

506,962   11/1954   Canada.................260/873

OTHER PUBLICATIONS

British Plastics, Feb. 1959, " High Mol. Wt. Plasticizers for P.V.C., Hill" pp. 74–77 and 89.

*Primary Examiner*—William H. Short
*Assistant Examiner*—Edward Woodberry
*Attorney*—Carl A. Castellan and George W. F. Simmons

[57] ABSTRACT

Plastic compositions based on poly(alkylene terephthalates), in particular poly(1,2-propylene terephthalate) polyesters intermixed in polyvinyl chloride compositions, are provided. The compositions of this invention provide improved processing characteristics with reduced melt viscosity and improved physical and mechanical properties such as tensile properties and weathering resistance.

8 Claims, No Drawings

TEREPHTHALIC ACID/1,2-PROPYLENE GLYCOL POLYESTER MODIFIERS FOR POLYVINYL CHLORIDE COMPOSITIONS

This invention relates to a class of polyesters and their use in polyvinyl chloride plastic compositions. Polyvinyl chloride compositions include, but are not limited to, polyvinyl chloride, copolymers of vinyl chloride, polyvinyl chloride polymers with modifying compounds, halogenated polyvinyl chloride, and plasticized vinyl chloride compositions. This invention further relates to poly(alkylene aryl dicarboxylates) such as polyalkylene phthalates, in particular certain polyalkylene terephthalates. Of particular preference is poly(1,2-propylene terephthalate) and its use in vinyl compositions. The inclusion of these polyesters in polyvinyl chloride compositions yields many advantages including greatly increased flow at melt temperatures, that is, processing temperatures, without significantly affecting the physical characteristics at normal service temperatures, improved impact strength or tensile properties in rigid extruded polyvinyl chloride sheet compositions, improved mechanical properties in plasticized vinyl compositions as well as many other unexpected qualities.

Polyvinyl chloride, hereinafter referred to as PVC, is widely used in the production of plastic articles. For most all uses PVC must be modified, compounded or copolymerized with other materials to provide processable and useful compositions. For the purpose and scope of this specification the term "polyvinyl chloride compositions" or "PVC compositions" will include all compositions which have vinyl chloride as the major (greater than 50 percent) component or starting material. The PVC compositions include, but are not limited to: PVC, copolymers of vinyl chloride with other monomers that include vinyl alkanoates such as vinyl acetate and the like, vinylidene halides such as vinylidene chloride, alkyl esters of carboxylic acids such as acrylic acid like ethyl acrylate, 2-ethylhexyl acrylate and the like, unsaturated hydrocarbons such as ethylene, propylene, isobutylene and the like, allyl compounds such as allyl acetate and the like; modified versions of the above polymers for impact strength with such modifiers as acrylic elastomeric impact modifiers, butadiene copolymers and the like, for processability, for example, on rolling banks with such materials as acrylic polymers such as copolymers of methyl methacrylate and ethyl methacrylate, for flexibility with such materials as plasticizers such as dioctyl phthalate, poly(propylene adipate) and the like, and other modifiers such as chlorinated polyethylene; and many others. The molecular weight and molecular weight distribution of the PVC polymers in the PVC compositions is not critical to the aims, purposes and results of using this invention. For general applications PVC with Fikentscher K-values in the range of 40 to 95 are generally used. The Fikentscher K-value is determined by the formula $$\frac{\log \eta_{rel}}{C} = \frac{75 \times 10^{-6} K^2}{1 + 1.5 \times 10^{-3} KC} + 10^{-3} K$$

where C is a constant concentration of polyester in solvent equaling 0.5 gm/100 ml, $\eta$ rel is relative viscosity in cyclohexanone at 25°C., and K is Fikentscher Value.

This copolymerization and compounding of these PVC compositions is necessary due to limitations of PVC. As an example, one of these limitations is the difficulty encountered in processing PVC at elevated temperatures. Mill processing on rolling banks may be improved and a partial remedy has already been mentioned—the acrylic copolymer processing aid. Acrylic copolymer processing aids improve the rolling bank and other processing characteristics of PVC compositions during mill processing, but usual fabrication temperatures for rigid PVC compositions can lead to thermal degradation of these compounds during extended fabrication periods. At the temperature of extrusion, injection, thermoforming, blow molding and the like, PVC compositions tend to degrade due to the relative heat instability of PVC and PVC compositions. It would be most desirable if PVC compositions could be processed in operations such as extrusion, injection molding, thermoforming, blow molding, and the like at lower temperatures or with shorter cycle times, thereby minimizing the change for thermal degradation. Certain compounds such as common plasticizers, that flexibilize the compositions at service temperatures, reduce the melt viscosity of PVC, but the inclusion adversely affects many of the physical properties or rigid compositions such as resistance to deformation at elevated temperatures. This is only one deficiency now alleviated by the invention, but it serves to demonstrate the state of the art at least in one part of the field of utility of the invention.

It now has been discovered that certain polyesters form useful homogeneous compositions in PVC and PVC compositions. It has now been further discovered that the incorporation of these polyesters in PVC compositions eliminates—or at least greatly improves upon—many of the deficiencies of these materials. For example, the difficulties encountered due to high temperature instability of PVC described above are essentially eliminated by the incorporation of the polyesters. These polyesters act to improve the processing characteristic and as a melt viscosity reducer. Further, the inclusion of these polyesters does not adversely affect the individual physical properties of PVC compositions to any significant degree. In fact, many of the physical properties of the compounds are improved by the inclusion of these polyesters. Other deficiencies of PVC compositions and the beneficial effects obtained by including the polyesters of this invention will be clear upon reading the specification.

The polyesters of this invention are poly(alkylene terephthalates) that may be described by formula (I):

(I)

wherein A is the residue of a terephthalic acid or mixtures of dibasic acids selected from the group consisting of terephthalic acid and other dibasic acids, wherein A is at least 75 mole percent terephthalic acid, G is the residue of 1,2-propylene glycol or mixtures of diols, wherein G is at least 75 mole percent 1,2-propylene glycol, and m is an average number greater than about 2.0; where m in formula (I) is relatively small and the molecular weight is consequently small, the acid functionality as a terminal group does affect the compatibility of the polyester in PVC compositions. Also, particularly when the hydroxy substitutions of a glycol are on a secondary carbon atom, it is more difficult to prepare high molecular weight polyesters with terminal acid functionality. It is preferred that the acid functional terminal groups be covered in some manner. This may be accomplished by the use of excess glycol or by esterifying the acid termination of the polyester with an alcohol such as ethanol, undecanol, and the like. Preferred polyesters of this invention are glycol-terminated polyesters of formula (II):

$$G-(AG)_n-AG \qquad (II)$$

wherein A and G have the same meaning described hereinbefore and n is an average number greater than about 1.0. The glycol terminated polyester of formula (II) is more easily prepared and yields the preferred balance of physical characteristics in PVC compositions.

As indicated hereinbefore, G is the residue of 1,2-propylene glycol or mixtures with other diols. These other diols may include, but are not limited to,
alkylene glycols such as
ethylene glycol
diethylene glycol
triethylene glycol,
higher polyethylene glycols,
1,3-propylene glycol
dipropylene glycols,
higher polypropylene glycols,
1,3-butylene glycol,
1,4-butylene glycol,
neopentyl glycol,
1,5-hexalene glycol, and substituted versions of these alkylene glycols and the like; cycloalkylene glycols such as
1,2-cyclopentanediol,
1,3-cyclopentanediol,
1,2-cyclohexanediol,
1,3-cyclohexanediol,
1,4-cyclohexanediol,
cyclobutanediols,
cyclobutanedimethanol,
cyclohexanedimethanol, substituted versions of these cycloalkylene glycols and the like; and aryl glycols such as the ethylene oxide or propylene oxide adducts of para, para-isopropylidenediphenol and the like. It is preferred that up to 25 mole percent of the residue of 1,2-propylene glycol be replaced with the residue of other glycols, in particular those containing 2 to 4 carbon atoms.

It is preferred that A and G be selected to provide polyesters with linearity and high glass temperatures. This may be obtained by utilizing major quantities of terephthalic acid in the preparation of the polyester. The other residues of dibasic acids in admixture with terephthalic acid include but are not limited to
aryl and alicyclic dicarboxylic acids, such as
isophthalic acid,
orthophthalic acid or anhydride,
naphthalene dicarboxylic acid or anhydride,
cyclohexyl dicarboxylic acids or anhydrides,
cycloheptane dicarboxylic acids or anhydrides,
substituted aryl and alicyclic dicarboxylic acids or anhydrides, such as
halogenated aryl dicarboxylic acids or anhydride like hepta-, chloro-, phthalic anhydride,
alkylene substituted aryl dicarboxylic acid or anhydrides,
endoalkylene substituted aryl carboxylic acids and substituted versions like 1,4,5,6,7,7-bicyclo(2.2.1)-5-heptane-2,3-dicarboxylic acid, and the like.

In regard to suitable polyesters of this invention, it has been found that for rigid non-plasticized PVC compositions the preferred chemical compositions within the chemical description of the polyesters of this invention is broader in view of the substantial effects on the physical characteristics. For plasticized PVC compositions the suitable chemical compositions of the polyesters is somewhat more limited. Unusual effects are obtained in rigid non-plasticized PVC compositions when other aryl dicarboxylic acids are used.

It has been found that in rigid, non-plasticized PVC compositions wherein rigidity and resistance to deformation at elevated temperatures are important characteristics, the polyester chosen is preferred to have an amorphous, glassy, softening point in the range of 65° to 200° C. It is more preferred that the softening point fall in the range of 65° to 120° C., and it is most preferred that the polyester have a softening point in the range of 75° to 100° C. This amorphous, glassy softening point is determined by placing chips of the polyester on a melting point block which is heated such that the temperature of the block is increased at the rate of about 2° C./minute. The softening point is determined when the chips either turn soft or when chips stick together. Of particular preference is poly(propylene terephthalate), hereinafter referred to as PGT, in that over the entire molecular weight range presently obtainable, great utility is found in PVC compositions.

The polyesters of this invention at all molecular weights obtainable under present technology are effective in PVC compositions. However, for a given PVC composition or particular balance of characteristics desired, specific molecular weight ranges are preferred. For example, in PGT modified compounds, as the molecular weight of PGT is increased, the impact strength is generally improved. For this effect it is preferred that the polyester have a number average molecular weight greater than about 4,000 and, more preferably, greater than about 7,000. Throughout this specification the term molecular weight refers to the number average molecular weight as determined by ebulliometric techniques. No upper limit of molecular weight is known as to the utility of PGT in PVC; however, for practical purposes a molecular weight less than about 20,000 is preferred and less than about 17,000 is more preferred. When PGT is utilized in PVC compositions primarily to improve melt processing behavior through the reduction in the melt viscosity, a molecular weight range of about 1,200 to 4,000 is preferred, and about 1,300 to 2,500 is most preferred, since maximum effect on melt viscosity is obtained with little or no significant sacrifice in the temperature of deformation under load over that range. PGT up to a molecular weight of 14,000 is effective in reducing the melt viscosity of PVC. When PGT is used in plasticized PVC compositions, for example, to improve the mechanical properties, low molecular weights are satisfactory since low hardness is generally desirable. In these systems molecular weights as low as 400 are effective; that is, when n of formula (II) is approximately 1.0. In these plasticized systems molecular weights of PGT are generally kept below 2,500 to limit the increase in rigidity and a range of 800 to 1,500 is preferred. Therefore, it will be clear from this, and the examples provided later, that certain molecular weight ranges are preferred for certain compositions and to attain certain physical characteristics, but there is essentially no limit on the molecular weight of the polyesters useful in PVC compositions. Generally, the greatest utility for these polyesters is obtained when the polyester molecule contains at least two repeating units of the residue of the glycol and the dibasic acid; that is, when $m$ is 2.0 or more in formula (I). The preferred range of molecular weight of the polyester is 400 to 20,000.

The polyesters of this invention may be prepared by several synthetic methods such as bulk, solution and interfacial condensation procedures. The polyesters may be obtained through esterification of the glycol mixture with the dibasic acid mixture with heat and catalysts such as metal salts of lead, tin, calcium, zinc and antimony along with organometallic compounds derived from such metals as tin and titanium. Alternatives for the terephthalic acid or isophthalic acid, which are somewhat intractable, are the lower alkyl esters of the dibasic acid and utilizing a transesterification reaction. The chloride of terephthalic acid may also be used. For example, PGT may be prepared as follows:

A two-liter resin kettle equipped with a close-fitting spiral double-flight stirrer, a nitrogen bubbler and a distillation column consisting of a steam jacketed column and a Dean-Stark take-off trap is placed in an oil bath at 160° C. A charge of 1,000 grams of dimethylterephthalate, 876 grams propylene glycol and 5 grams litharge is placed in the kettle. As the oil bath temperature is increased towards 230° C., the reactants gradually become clear and methanol evolves, indicating transesterification has begun. The temperature of the oil bath is maintained at 228°–230° C. for a period of approximately 250–300 minutes during which about 85–94 percent of the theoretical amount of methanol is recovered. At that time the nitrogen bubbler is replaced with a vacuum-tight inlet valve and the distillation column is replaced by a water-cooled distillation head connected to a dry-ice isopropanol cooling receiver. The pot temperature is allowed to cool to 210° C. and vacuum is slowly applied so that the rate of distillation of the excess propylene glycol is well controlled. After two hours the system is placed under high vacuum and maintained at 0.2 mm. Hg. with a slow nitrogen feed until a Gardner-Holdt viscosity (25 percent in tetrachloroethane) of N to P is obtained. During the total reaction time of six hours the amount of distillate obtained under vacuum is about 450 to 500 grams. As the reaction vessel is brought to atmospheric pressure, a strong nitrogen flow is applied. The physical characteristics of the PGT include:

| | |
|---|---|
| Hydroxyl Number (mg. KOH/gm PGT) | 12.5 – 13.5 |
| Acid number (mg. KOH/gm PGT) | 2.8 – 3.5 |
| Iodine Number (gm.I$_2$/100 gm PGT) | 0.4 – 0.6 |
| Water Content (Karl-Fischer Method) | 0.03% |
| Yield | 2.2 lbs. |
| Molecular Weight | 8000 |

The molecular weight of the polyester may be adjusted by stopping the reaction at the desired viscosity. Thus, a low molecular weight PGT may be obtained with charges of 876 grams propylene glycol and 856 grams terephthalic acid. The reaction is run at temperatures up to 187° C. and a vacuum is applied towards the end of the reaction, after about 23 hours. A sample of PGT with Gardner-Holdt viscosity of about A–4⁻ (25 percent in tetrachloroethane), with a V.C.S. color of 1 and a molecular weight of about 900 is obtained.

The following examples are supplied to demonstrate how the polyesters of this invention may be used in some of the preferred embodiments of the invention. In no way should these examples be taken to limit the scope or the underlying principles of the invention in any way. Only some of the advantages and improvements obtained will be mentioned, but one skilled in the art will be able to appreciate many more embodiments of the invention from these examples. The following abbreviations will be used and those already mentioned will be repeated for convenience. Percentages are by weight unless otherwise noted:

| | |
|---|---|
| PVC | polyvinyl chloride ( a number following will characterize the molecular weight by the Fikentscher K—value system |
| PGT | a number in parenthesis following these abbreviations will refer to the number average molecular weight use × 10⁻³. |
| PGS | poly(propylene sebacate) |
| DOP | dioctyl orthophthalate |
| DTUL | deformation temperature under load in °C. using ASTM Procedure D–648–56 |
| n | melt viscosity — poise at 400° F. × 10³ sec.⁻¹ |
| $\overline{Mn}$ | number average molecular weight |

EXAMPLE 1

The samples discussed are all fluxed on a two-roll barrel mill at 350° F. and pressed at 350° F. into 100 mil sheets for testing. Unless otherwise noted, 1 percent of a commercially available tin stabilizer, dibutyltin mercaptopropionate and one-half percent of a lubricant, such as glycerol monostearate, is incorporated into the compound.

a. Sheets of PVC(68) are prepared with portions of the PVC replaced with the concentrations of the additives shown in Table I below:

TABLE I

Effect of Various Modifiers in PVC

| Modifier | | Properties of PVC Blends | | |
|---|---|---|---|---|
| | | Melt Viscosity | | |
| Type | % | (poise) 400° F.; 10³ sec.⁻¹ | DTUL, °C. | Vicat Temp., °C. |
| None | 0 | 7,000 | 75 | 85 |
| PGT (1400) | 5 | 6,300 | 72 | 82 |
| | 10 | 6,000 | 70 | 81 |
| | 20 | 4,600 | 73 | 78 |
| Acrylic Processing* Modifier | 5 | 7,000 | 79 | 85 |
| DOP | 5 | 5,800 | 62 | 70 |
| Poly (propylene sebacate | 20 | 3,500 | 45 | 53 |

*copolymer of 80 parts methyl methacrylate and 20 parts ethyl methacrylate

These data clearly show that PGT reduces the melt viscosity without affecting the DTUL to a significant degree. On the other hand, the "acrylic processing modifier" hardly affects the melt viscosity while the common plasticizers severely reduce the DTUL.

b. Sheets of 80 percent PVC (68) and 20 percent PGT of varying molecular weights are shown in Table II. This table shows that molecular weight of the polyester additive hardly affects the DTUL over a wide range, but the melt viscosity is greatly reduced as the molecular weight of the polyester is lowered.

TABLE II

Effect of PGT of Various Molecular Weights on PVC

| PGT Gardner-Holdt Viscosity* | $\overline{M}_n$ of PGT | Properties of Sheets Melt Viscosity (poise, at 400°F.; $10^3$ sec.$^{-1}$) | DTUL, (°C.) | Vicat Temp. (°C.) |
|---|---|---|---|---|
| None | None | 7,000 | 73 | 85 |
| T—U | 13,200 | 6,700 | 74 | 85 |
| A—B | 2,520 | 5,200 | 71 | 79 |
| $A_2$ | 1,380 | 4,600 | 73 | 78 |
| $A_4$ | 860 | 4,200 | 65 | 72 |
| $A_5$ | 440 | 3,700 | 51 | 62 |

*25% in tetrachloroethane c. Sheets of PVC (68) with varying concentrations of PGT (1,400) and PGT (850) are shown replacing the PVC in Table III below:

TABLE III

Effect of Concentration of PGT in PVC

| % PGT (1400) | Melt Viscosity (poise at 400°F.; $10^{-3}$ sec.$^{-1}$) | DTUL, (°C.) |
|---|---|---|
| 0 | 7,000 | 73 |
| 5 | 6,300 | 72 |
| 10 | 6,000 | 70 |
| 20 | 4,600 | 73 |
| % PGT (850) | | |
| 0 | 7,000 | 73 |
| 5 | 6,300 | 72 |
| 10 | 6,000 | 70 |
| 20 | 4,200 | 65 | d. Sheets of 80% PVC (68) and 20 percent of the additive as indicated are prepared as shown in Table IV below:

TABLE IV

Effect of Modifiers on the Physical Properties of PVC

| Modifier | Modifier $\overline{M}_n$ | , cps | DTUL °C. | Tensile Properties Modulus (psi) | Elongation (%) | Strength (psi) |
|---|---|---|---|---|---|---|
| Unmodified | — | 700,000 | 73 | 385,000 | 134.6 | 8195 |
| PGT | 1400 | 460,000 | 401,000 | | 124.5 | 8397 |
| | 850 | 420,000 | 65 | 462,000 | 3.3 | 10034 |
| Poly (propylene sebacate) | — | 350,000 | 45 | 255,000 | 210.2 | 5758 |
| DOP | — | — | — | 90,000 | 190.6 | 4167 |
| DCHP* | — | 330,000 | 50 | — | — | |

*Dicyclohexylphthalate, solid plasticizer

These data clearly show that the PGT modified PVC has similar physical characteristics to the unmodified PVC provided the $M_n$ of PGT is greater than about 850 while conventional plasticizers display completely different physical characteristics in PVC compositions.

e. A sheet of 80% PVC (68) and 20% PGT (1,400) is prepared with 3 percent of a standard barium-cadmium soap heat stabilizer. When tested in comparison with unmodified PVC, the PGT modified compound had significantly more resistance to heat degradation at 350° F. as shown in Table V below.

TABLE V

Effect of PGT on Heat Resistance, Clarity and Crease Whitening Resistance

| %PGT (1400) | Hours to Color at 350° F. | Hours to Char at 350° F. | Total White Light Transmittance(%) | %Haze | Crease Whitening Resistance* |
|---|---|---|---|---|---|
| 0 | ¾ | 4–5 | 42.5 | 79.0 | 9 |
| 20 | 1 ½ | greater than 5 | 69.0 | 21.8 | 5 |

*Based on a relative scale of 0–10 where 0 is considered excellent

The inclusion of PGT improves the heat resistance, clarity and the crease whitening resistance of PVC depending upon the choice of heat stabilizer.

f. In milled/pressed sheets the inclusion of PGT in PVC does not appear to detract significantly from the impact resistance as shown in Table VI.

TABLE VI

Effect of Molecular Weight of PGT on Impact Strength

| Amount of PGT (%) | Modifier $\overline{M}_n$ | Impact of Blend Izod Notched (ft.lbs./in) | Tensile (ft.lbs./in²) | Falling Ball (ft.lbs.) |
|---|---|---|---|---|
| None | | 1.0 | 209 | 12 |
| 20 | 13,200 | 1.0 | — | — |
| 20 | 2,520 | 0.7 | 153 | — |
| 20 | 1,380 | 1.0 | 156 | 12 |

2. As indicated hereinbefore, processing modifiers are generally necessary for commercial production. Under the small-scale test conditions of Example 1, the unmodified PVC may be formed into sheets but such unmodified formulation would not be generally commercially useful. Therefore the comparison between a composition containing an acrylic processing modifier that is capable of being used with commercial extrusion techniques and a composition of this invention is most relevant. The lowering of the melt viscosity by the use of the invention has been demonstrated earlier. The effect on the inclusion of PGT on falling dart impact strength of PVC (68) is shown in Table VII.

TABLE VII

| % Modifier | Dart Diameter (inches) | Number of Specimens | Falling Dart Impact (ft.-lbs) |
|---|---|---|---|
| 25% PGT (4,400) | 0.25 | 18 | 8.19 |
|  | 1.50 | 17 | 28.5 |
| 25% PGT (13,200) | 0.25 | 18 | 7.75 |
|  | 1.50 | 1870.1 |  |
| 10% Acrylic Processing Modifier | 0.25 | 19 | 7.1 |
|  | 1.50 | 15 | 8.5 |

3. In plasticized compositions the physical and mechanical properties at a given hardness may be somewhat deficient. The inclusion of PGT In plasticized PVC compositions improves the tensile strength and the tear strength of the sheet. The use of PGT also improves the thermoformability of plasticized sheet by reducing the shrinkage upon aging after forming. These valuable improvements are demonstrated on Table VIII and IX. The following compositions, the properties of which are listed in Table VIII, are milled at 350° F. for 10 minutes to prepare the sheet.

| | Parts |
|---|---|
| PVC (73) | 80 |
| PGT (1400) | as shown |
| poly(propylene sebacate) | as shown |
| trioctyl trimellitate | 60 to 65 as shown |
| calcium carbonate powder | 50 |
| titanium dioxide (RANC) | 5 |
| elastomeric impact modifier* | 20 |
| barium/cadmium laurate heat stabilizer | 2 |

*impact modifier — a graft polymer of alkyl methacrylate such as methyl methacrylate polymerized in the presence of butadiene/styrene elastomer.

TABLE VIII

Effect of PGT on Physical Properties of Plasticized PVC Compositions

| Composition | | | | |
|---|---|---|---|---|
| Trioctyl trimellitate | 60 | 65 | 60 | 60 |
| PGT (1400) | 10 | 0 | 0 | 0 |
| Poly(propylene sebacate) | — | — | — | 10 |
| Physical Properties | | | | |
| Shore A-2 Hardness — 15 sec. | 77 | 77 | 79 | 73 |
| Tensile strength (psi) | 1926 | 1730 | 1836 | 1643 |
| Elongation at break (%) | 390 | 385 | 374 | 380 |
| Tear strength (lb/in thickness) | | | | |
| with calendar | 235 | 204 | 213 | 197 |
| against calendar | 266 | 238 | 241 | 220 |
| Vacuum Forming (%shrinkage after 16 hrs. at RT/5 min. at 180° F. | | | | |
| Forming temperature: | | | | |
| 300°F. with calendar | .6/2.7 | 1.9/2.9 | 1.8/4.1 | 1.2/2.3 |
| 300°F. against cal. | 1.7/2.9 | 2.5/3.3 | 1.7/3.6 | 1.9/3.3 |
| 320°F. with calendar | .6/2.3 | 1.6/2.5 | 0.8/2.3 | 1.6/2.5 |
| 320°F. against cal. | 1.7/1.9 | 2.1/2.3 | 1.0/2.1 | 1.3/2.1 |

The following compositions, milled for 10 minutes at 350° F. and pressed into sheets, give the physical characteristics shown in Table IX.

| | Parts |
|---|---|
| PVC (73) | 80 |
| Elastomeric impact modifier of Example 3 | 20 |
| PGT ($\overline{M}n$ as shown) | 10 |
| Trioctyl trimellitate plasticizer | 60 |
| Calcium carbonate powder | 50 |
| Titanium dioxide (RANC) | 5 |
| Barium/cadmium laurate heat stabilizer | 2 |

TABLE IX

Effect of PGT at Various Molecular Weight on Plasticized PVC Composition

| $\overline{M}n$ of PGT | 850 | 1400 | 2500 |
|---|---|---|---|
| Shore A Hardness —15 sec. | 73 | 78 | 78 |
| Tensile strength (psi) | 1672 | 1796 | 1806 |
| % Elongation at break (%) | 388 | 370 | 390 |
| Tear strength (lb./in. thickness) | | | |
| with calender | 195 | 227 | 233 |
| against calender | 280 | 257 | 271 |
| Vacuum forming (% shrinkage after 16 hrs. at RT/5 min. at 180° F.) | | | |
| Forming Temperature: | | | |
| 300° F. with calender | 1.0/2.5 | 1.0/2.3 | 12/2.7 1.8/3.5 |
| 300° F. against calender | 1.0/1.9 | 1.3/2.9 | 1.3/2.5 2.3/3.6 |
| 320° F. with calender | 0.6/1.4 | 0.8/1.9 | 0.8/1.6 1.2/2.3 |
| 320° F. against calender | 0.6/1.3 | 1.7/2.1 0 | .8/1.7 1.5/2.3 |

4. The inclusion of PGT in PVC modified with 10 percent acrylic elastomeric impact modifier reduces the melt viscosity while not significantly changing the DTUL or the impact strength at room temperature. The use of PGT in impact modified PVC compositions is also helpful in matching the refractive index of the phases to provide the most esthetic appearance of such products as blow-molded bottles.

EXAMPLE 5

Blends of various amounts of PGT (2,500) and PVC (68–73) were milled at 360° F. for approximately 2 minutes. The blend was removed, granulated, dried for 16 hours at 70° C. and injection molded at 360° to 380° F. into a mold maintained at about room temperature. Typical physical properties obtained from these test specimens are listed in Table X:

TABLE X

Effect of Concentration of PGT in PVC on Physical Properties

| Composition | | Tensile Impact | DTUL at 264 | Elongation at Maximum | Tensile Tests Maximum Stress | Modulation of Elasticity |
|---|---|---|---|---|---|---|
| PVC (%) | PGT (%) | (ft-lb/in²) | psi, °C. | Stress (%) | (psi) | (psi) |
| 1. 100 | 0 | 26.7 | 65.7 | 3.01 | 8572 | 479,000 |
| 2. 90 | 10 | 126.5 | 67.7 | 2.98 | 8414 | 446,000 |
| 4. 82.5 | 17.5 | 170.1 | 66.0 | 3.23 | 8421 | 432,000 |
| 5. 75 | 25 | 183.7 | 65.3 | 3.30 | 8498 | 426,000 |
| 6. 60 | 40 | 83.1 | 67.0 | 3.25 | 8985,000 | |
| 7. — | 100 | 14.1 | 73.0 | — | 3300 | 370,000 |

EXAMPLE 6

Blends of 75 parts PVC of various molecular weights were blended with 25 parts PGT (1,600–1,700), 1 part dibutyltin mercaptopropionol (DBTMP), and 0.5 part glycerol monostearate (GMS), and processed through screw extrusion and injection molding equipment. Typical processing and physical characteristics are shown in Table XI.

TABLE XI

Effect of Various PVC Resins on Processing and Physical Characteristics of PVC/PGT Blends

| PVC Fikentscher K-Value | | 57 | 68 | 72-73 |
|---|---|---|---|---|
| Extrusion Conditions | | | | |
| Temperature Profile across the 1" Extruder (°F) | Zone 1 | 330 | 330 | 330 |
| | Zone 2 | 350 | 350 | 350 |
| | Zone 3 | 370 | 370 | 370 |
| | Die | 370 | 370 | 370 |
| Screw Speed (rpm) | | 175 | 175 | 175 |
| Vacuum Reading (in. of Hg.) | | 27 | 27 | 27 |
| Injection Molding Conditions | | | | |
| Cyl. Temp.(°F) | | 340 | 370 | 385 |
| Block Temp. (°F) | | 150 | 150 | 150 |
| Pressure (lbs/in² on ⅞" ram) | | 400 | 600 | 600 |
| Physical Test Properties | | | | |
| Melt Flow Viscosity (400° F/ 100 sec-, poises) | | 2120 | 3600 | 4080 |
| Impact: | | | | |
| Izod unnotched, ⅛" bar (ft-lbs) | | 17 | 18 | 22 |
| Izod notched, ¼" bar (ft-lbs) | | 0.3 | 0.4 | 0.4 |
| Izod molded notch, bar (ft-lbs) | | 0.3 | 0.3 | 0.5 |
| Charpy unnotched (ft/lbs/½" × 1") | | 8 | 15 | 13 |
| Tensile Tests: | | | | |
| Maximum Elongation (%) | | 3.3 | 3.3 | 3.3 |
| Maximum Stress (psi) | | 8900 | 9000 | 9000 |
| Modulus of Elasticity (psi) | | 446,000 | 451,000 | 442,000 |
| Flexural Strength: | | | | |
| Maximum Strain (in/in) | | 0.042 | 0.043 | 0.044 |
| Maximum Stress (psi) | | 482,000 | 505,000 | 474,000 |

EXAMPLE 7

Blends of 80 parts PVC (72-73), 1 part DBTMP and 20 parts of various polyesters were milled for 7 minutes and compression molded at 350° F. Typical physical characteristics for these moldings are shown on Table XII.

TABLE XII
[Effect of polyester compositions on physical characteristics of PVC/polyester blend]

| Polyester | Gardner-Holdt Viscosity [1] | $\overline{M}_n$ | n² poises | DTUL (°C.) | Izod impact | Clarity Percent WL[3] | Percent Haze |
|---|---|---|---|---|---|---|---|
| 1,2-propylene/ethylene (100/0) terephthalate | A-B | 2,500 | 5,100 | 74 | 1.0 | 84.5 | 8.0 |
| 1,2-propylene/ethylene (90/10) terephthalate | B | | 5,338 | 71 | | 79.8 | 11.7 |
| 1,2-propylene/ethylene (80/20) terephthalate | A | | 5,419 | 66 | 0.8 | 82.0 | 9.6 |
| 1,2-propylene/ethylene (50/50) terephthalate | B-C | | 7,522 | 70 | | 74.0 | 14.9 |
| 1,2-propylene/ethylene (25/75) terephthalate | | | 5,257 | 70 | 0.4 | 21.8 | 100 |
| 1,2-propylene/ethylene (10/90) terephthalate | | | | | 0.4 | Opaque | |
| 1,2-propylene/ethylene (0/100) terephthalate | | | | | | Opaque | |
| Ethylene isophthalate | A₁ | | 3,150 | 70 | 0.4 | | |
| 1,2-propylene isophthalate | A₂ | | 4,610 | 67 | | 78.2 | 12.3 |
| 1,3-butylene isophthalate | A₂-A₁ | 1,600 | 4,610 | 61 | | 63.5 | 18.9 |
| Do | E | 3,700 | 4,917 | 66 | 0.6 | 83.5 | 7.8 |
| 1,3-butylene terephthalate | A | | 5,000 | 65 | | 78.4 | 12.0 |
| 1,2-propylene/ethylene (50/50) isophthalate | B | | 4,763 | 64 | | 58.5 | 61.3 |
| Ethylene isophthalate/terephthalate (50/50) | E+ | | 3,842 | 71 | 0.3 | Opaque | |
| Ethylene isophthalate/terephthalate (25/75) | | | 3,073 | 71 | 0.3 | | |
| 1,2-propylene isophthalate/terephthalate (50/50) | A₃ | | 4,533 | 69 | 0.4 | 73.5 | 18.4 |
| 1,2-propylene sebacate | | | 3,500 | 45 | 0.3 | 82.0 | 7.3 |
| None | | | 7,000 | 73 | 1.2 | 87.0 | 5.7 |

[1] =25% in tetrachloroethane.
[2] =Determined in a Sieglaff-McKelvey rheometer at 400° F. and a shear rate of 10³ sec.⁻¹.
[3] =Total whote light transmittance.

The composition containing PGT exhibited considerably better mill processing behavior of the other polyesters listed in Table XII

EXAMPLE 8

Blends of 80 parts PVC (68), 1 part DBTMP, 0.5 part GMS and 20 parts of the modifier, if any, were processed as in Example 7 and exposed continuously to high intensity ultraviolet light. Typical results to this exposure demonstrating improved resistance to exposure of the PGT modified composition are presented in Table XIII.

TABLE XIII

Ultraviolet Light Resistance (Fadeometer) of PVC and Blends with Modifiers

| | Exposure for 0 Hr. | | | Exposure for 100 Hrs. | | | Exposure for 500 Hrs. | | |
|---|---|---|---|---|---|---|---|---|---|
| Modifier | % W.L.* | % Haze | Color | % W.L. | % Haze | Color | % W.L. | % Haze | Color |
| PGT (1400) | 85.7 | 6.4 | Clear | 84.2 | 6.5 | Sl. Yellow | 82.5 | 7.3 | Yellow |
| PGS | 82.8 | 8.2 | Yellow | 83.2 | 8.1 | Yellow | 73.5 | 5.5 | Brown |
| None | 85.0 | 6.9 | Clear | 82.6 | 8.7 | Sl. Brown | 74.2 | 14.4 | Brown |

*W.L. is total white light transmittance.

We claim:

1. An intimately mixed plastic composition of improved processing characteristics and physical characteristics, comprising
   a. a polyvinyl chloride composition and
   b. a polyester of the formula $$G—(AG)_n—AG$$

Where $A$ is the residue of terephthalic acid or mixture of dibasic acids selected from the group consisting of terephthalic acid and other dibasic acids, wherein A is at least 75 mole percent terephthalic acid;

$G$ is the residue of 1,2-propylene glycol or mixtures of diols, wherein G is at least 75 mole percent 1,2-propylene glycol, and $n$ is such that said polyester is further characterized by a number average molecular weight in the range of about 1,200 to 4,000.

2. The plastic composition of claim 1 wherein A is the residue of terephthalic acid and G is the residue of 1,2-propylene glycol.

3. The plastic composition of claim 1 wherein $n$ is chosen so as to provide a number average molecular weight in the range of about 1,300 to 2,500.

4. An injection-molded product of claim 3.
5. An extruded product of claim 1.
6. A rigid sheet of claim 1.

7. The plastic composition of claim 1 wherein up to 25 mole percent of A is chosen from the group consisting of isophthalic acid and orthophthalic acid or anhydride, and up to 25 mole percent of G is chosen from the group consisting of ethylene glycol, 1,3-butylene glycol, and neopentyl glycol.

8. The plastic composition of claim 1 which includes an alkyl methacrylate-butadiene/styrene graft polymer impact modifier.

* * * * *